March 23, 1943. J. W. MAUSSENET Re. 22,294

BOTTLE CLOSURE

Original Filed April 19, 1938

INVENTOR
JOHN W. MAUSSENET.
BY J. Howard Flint.
ATTORNEY

Reissued Mar. 23, 1943

Re. 22,294

UNITED STATES PATENT OFFICE 22,294

BOTTLE CLOSURE

John W. Maussenet, Long Island City, N. Y.

Original No. 2,146,903, dated February 14, 1939, Serial No. 202,830, April 19, 1938. Application for reissue May 18, 1940, Serial No. 336,057

6 Claims. (Cl. 215—18)

Figure 1:
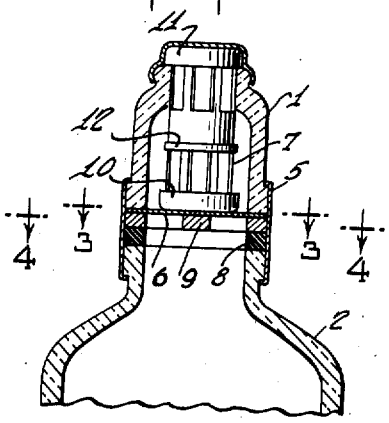

This invention pertains to closures, particularly for bottles.

Numerous means have been proposed to protect bottled liquids against substitution or replacement, but previous devices to be applied to the neck of a bottle sometimes have been cumbersome and expensive, sometimes fragile, and sometimes uncertain and unreliable in use.

An object of this invention is to provide closure means of simple and inexpensive nature to guard a bottle effectively against refilling, and further to prevent impairment of the quality of liquid. It is an object that a closure not only protect bottled liquid against replacement and against evaporation losses, but also assure that a bottle after opening remain uncontaminated with dust. A further purpose is to provide such a closure in form readily adaptable to differing styles of bottle. An important object also is to provide a closure which can readily be manufactured and assembled by high speed operations, but yet shall be positive and dependable in action.

Another object is to provide an automatic bottle closure of tubular form adapted to slide under the force of gravity in the neck of a bottle to close the same when the bottle is upright, and to slide to open position when the bottle is tipped with its mouth in a lowered position as occurs in the normal process of pouring liquid thereupon.

Another object is to provide a combined closure and pouring device which will automatically operate to close a bottle and automatically operate to open and serve as a pouring means or spout, when the bottle is tipped to pour liquid therefrom.

A further object is to provide a device of the class described which will overlie the face of the annular end of the bottle neck and thereby prevent the lodgment of dust thereon while the bottle is not in use.

The principles of this invention will be described with reference to an illustrative embodiment which is shown in the appended drawing, and more fully explained in the following description, with the novel features thereof particularly pointed out in the accompanying claims.

Figure 2:
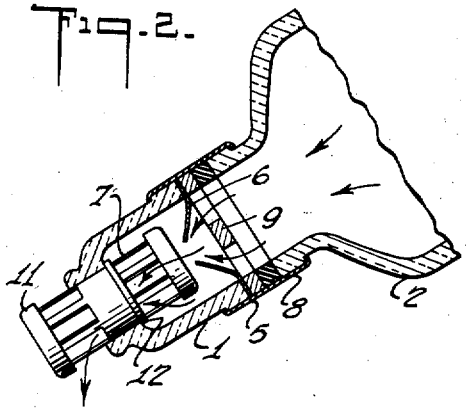
Figure 3:
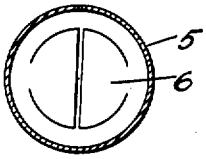
Figure 5:
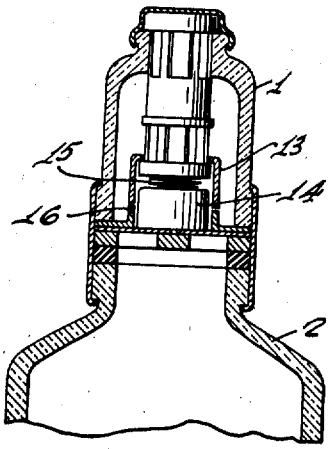
Figure 4:
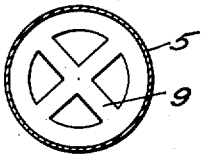

In the drawing:

Figure 1 is a section through a bottle top in upright position,

Figure 2 is a section through an inverted bottle top, showing in elevation a guard in open position co-operating with an underlying flap valve, Figure 3 is a plan of the flap valve, as shown from the line 3—3 of Figure 1, Figure 4 is a plan of a seat for the flap valve, as shown from the line 4—4 of Figure 1, and Figure 5 is a section through a bottle neck in upright position showing a modified form of this invention, with a guard in elevation shown in closed position.

The embodiment of this invention shown in the drawing is at present preferred, but without limitation thereto beyond the scope of claims.

Referring more particularly to the drawing, there is shown a bottle neck 1 that is separably secured to a bottle 2, as for instance by a metal band 5 crimped over suitable shoulders on the neck and on the bottle. In the bottom of the neck is secured a flap valve 6, above which a cylindrical guard 7 extends with sliding engagement through the upper neck opening.

Below the flap valve 6, the engaging faces of the neck and the bottle are made tight by a gasket 8. Upon the gasket is interposed an annular barrier 9 containing a cross-bar, as shown in Figure 4 and above this barrier is secured a diaphragm 6 containing flap valves as shown in Figure 3. These three elements, diaphragm 6, gasket 8 and barrier 9 are shown clamped between the neck 1 and bottle 2 so that the cross bar of barrier 9 supports the flap of valve 6, as shown in Figure 1. The diaphragm or disk 6 preferably is slit to contain two opposed semicircular flaps that meet along a common diameter upon the support of barrier 9, as shown in Figure 3.

This arrangement makes it feasible to construct valve disk 6 of exceedingly thin but resilient material of inexpensive nature. For many purposes this material also must be capable of withstanding the action of alcoholic liquid or vapors for considerable time. Preferably then this diaphragm 6 is of a parchmentized paper such as has been indurated with protein material and known in the trade as "Patapar." This paper has been caused to absorb soya or other vegetable protein, and is tough even after standing some time in fumes of alcohol. Such a flap valve is reliable, and the flaps are of such light weight as to open or close readily under even slight pressure. They seat evenly even though stamped or cut by high-speed machinery.

Above valve disk 6 elongate cylinder 7 is mounted and constructed to perform several functions.

This cylinder 7 is closed or capped at its top and bottom, so as to minimize any possibility of inserting an object under the flaps of valve 6. Thus the cylinder acts as a guard. The lower cap 10 of guard 7 may be integral with the guard if desired, but the upper cap 11 preferably is attached, and sealed, after the guard is assembled in the bottle neck. This is so that the upper end of cylinder 7 may project above the mouth of the bottle. At an intermediate line of guard 7 is fastened a shoulder or other projection 12 to limit the outward movement of the guard. This stop 12 may be applied after the guard 7 is assembled in the neck, so that upper cap 11 may be made integral with guard 7 and lower cap 10 may be attached after assembly; or, both caps may be detached and the ends of the guard be initially interchangeable. This construction thus is readily adapted for quick assembly and for replacement.

Further, guard 7 in preferred form is constructed so that caps 10 and 11 extend along the cylinder wall or the cylinder wall at each end is closed for a distance. This further minimizes the possibility of tampering with flap valve 6 by insertion of a wire or reed through guard 7. In addition the middle wall portion of guard 7 preferably is closed, and seats snugly in the mouth of bottle neck 1. This not only minimizes tampering but also strengthens the guard and serves to guide the cylinder. The walls of guard 7 are open near this middle portion but between the middle and the end may be columnar as shown, or may be otherwise formed for additional safeguard against tampering. The cylinder is hollow, so that when the bottle is inverted, liquid may flow out by entering the side of the cylinder, and emerging from the side. Thus the cylinder is in the form of a closed sleeve guard. This form not only is a safeguard, but provides such a path that liquid emerges smoothly and without dissipation of dissolved gases, rather than gushing and splashing.

The arrangement of cap 11 is such that when the bottle is upright, the bottom of guard 7 presses down circumferentially upon flap valves 6 to hold them closed. In the form shown in Figure 1 cap 10 rests directly upon flaps 6. In this function, the enlargement of cap 10 also contributes to the difficulty of tampering with flaps 6. Stop element 12 is disposed so that, for pouring, guard 6 slides away from flaps 6 just sufficiently for liquid to emerge from the open flaps, while just sufficient opening is exposed outside the bottle for liquid to pour.

In a modification of this invention, shown in Figure 5, further protection is provided against surreptitious opening of disk flaps 6. In this form, a sleeve 13 is clamped around the lower end of guard 6. Within sleeve 13 is a movable plunger block 14 which substantially fills the sleeve but is adapted to slide down easily upon disks 6 when the bottle is in upright position. Between block 14 and the bottom of guard 6 is interposed a light compression spring 15 which tends to keep block 14 down upon disk valve 6 even if the guard 6 is raised while the bottle is upright. However, when the bottle is inverted two factors combine to free valves 6 for opening: the guard 6 moves away under gravity and also block 14 moves its weight against the light spring 15. Thus quick action is provided when the bottle is inverted; while when the bottle is upright, the advantages of a disk valve with its positive seating are secured and guarded.

Further, as shown in Figure 5, there may be interposed above valve diaphragm 6, an annular member with circular upstanding walls 16 in registry with sleeve 13. Thus the hinge area of flap valve 6 is strengthened and protected against rupture, and also additional protection is afforded against opening flap 6 except for pouring. Even in pouring, walls 16 lend protection to flaps 6, so that tampering with the valve is substantially impossible.

Materials for construction of this invention may be selected by those skilled in this art, but the combination of parts herein are such as to permit the use of fusible material such as glass for the guard. Or moldable resins, or hard rubber, may be used. The structure is reliable even though formed and assembled by present-day high speed operations.

In the use of this invention, the guard may be assembled in various bottle necks and may be replaced from standard parts. Ordinarily the body of a bottle would be filled with liquid, and then the assembled neck with interposed gasket and valve disks clamped to the bottle. The neck may have been pre-sealed if desired.

When the bottle is opened and inverted, the sleeve guard slides slightly out of the neck to expose openings for pouring, while the pressure of liquid opens the valve flaps. Liquid flows in a tortuous path around the bottom of the guard and emerges out of the side of the projecting guard. While open, the arrangement of caps and walls at the ends of the guard protects the flap valves against ready insertion of an object. When the bottle is restored to upright position, the flap valves afford a dependable seat, which is enhanced by pressure from the guard. Guard cap 11 closes the bottle effectively against entrance of dust and against escape of vapors. In this way is preserved a high degree of cleanliness and quality of liquid. This is promoted further, and the guard is guided for dependable registry upon the valves, by the close seating of a considerable middle portion of the guard in the bottle neck.

The guard cylinder or hollow sleeve 7 with caps 10 and 11 and shoulder 12 may be used without a valve such as the flap valve shown in the drawing and will then function as just described, as an automatic closure and pouring device, having the advantages of acting as an automatic stopper or cork which cannot be displaced or separated from the bottle and forming a pouring device having a freely projecting outer end forming a delivery spout adapted to guide the outflowing liquid, the upper cap 11 overlies the annular rim on the outer end of the bottle neck so that when the bottle is standing and the device is in closed position the lodgment of dust on this rim is prevented.

An outer seal as shown extending over the cap 11, Figure 1 may be crimped as shown to the neck member 1 to lock the device in closed position for shipment, thus sealing the bottle until it is opened for use.

Also, it will be noted that the neck member 1 has an inwardly extending portion of lesser diameter than the stop 12 adapted to engage with said stop to limit the outward movement of the sleeve 7.

In accordance with the patent statutes, the principles of this invention have been described, and illustrated by reference to a particular embodiment in the best mode of application now contemplated, but it is evident that other specific arrangements and adaptations of this invention may now be made by those skilled in the art, within the scope of the appended claims.

I claim:

1. A non-refillable bottle comprising a separable neck, a diaphragm secured between the body of the bottle and the neck and containing a pair of co-operating flap valves having a common opening, a sleeve guard containing a central fluid conduit with inlet and outlet openings in the side walls and a cap at each end, the guard being fitted to slide in the neck and in downward position to exert pressure upon the flap valves and to close the neck, and means to limit outward sliding of the cylinder.

2. A non-refillable bottle comprising a separable neck, a diaphragm secured between the body of the bottle and the neck containing a pair of semi-circular flap valves meeting along a common opening, a support bar secured under the flaps, a hollow sleeve guard adapted to press upon the flaps and to slide snugly in the neck, the guard being closed along the middle and each end and containing inlet and outlet openings near the closed middle portion.

3. A non-refillable bottle comprising a separable neck, a diaphragm secured between the neck and the body of the bottle and containing a pair of co-operating flap valves meeting along a common opening, an annular support containing a cross bar under the opening of the flaps, a hollow cylindrical guard filling the top of the neck, the guard being closed at each end and along the walls adjacent each end and at the middle, the guard being adapted to slide in the neck and containing openings near the middle walls to conduct liquid from the bottle with the guard in outward position, the guard being adapted in downward position to press upon the flap valves and to close the neck, and means to limit outward sliding of the cylinder to a position near the flaps when open and to expose the outlet openings for pouring liquid.

4. A non-refillable bottle comprising a separable neck, a diaphragm secured between the body of the bottle and the neck containing a pair of semi-circular flap valves, a support under the flap valves, a hollow cylindrical guard containing inlet and outlet openings in its side and adapted to slide in the neck and bearing caps at each end, an open sleeve fitted over the bottom cap, a plunger freely movable in the sleeve and a light spring interposed between the plunger and the lower guard cap.

5. A non-refillable bottle comprising a separable neck, a diaphragm secured between the body of the bottle and the neck containing a pair of semi-circular flap valves, an annular member secured above the flap valve diaphragm and containing a circular wall about the valve flaps, a hollow cylindrical guard closed at its ends and containing inlet and outlet openings in its side and adapted to slide in the neck, an open sleeve fitted over the bottom cap, and a plunger freely movable in the sleeve to rest upon the flaps, the sleeve being constructed to register with the circular wall about the flap valve for protection against tampering.

6. A bottle closure comprising a neck, a diaphragm secured near the bottom of the neck and containing a pair of cooperating flap valves having a common opening, a sleeve guard containing a central fluid conduit with inlet and outlet openings in the side walls and a cap at each end, the guard being fitted to slide in the neck and in downward position to press down upon the flap valves and to close the neck, and means to limit outward sliding of the cylinder.

JOHN W. MAUSSENET.